(12) United States Patent
DiFrank et al.

(10) Patent No.: US 7,063,498 B1
(45) Date of Patent: Jun. 20, 2006

(54) METHOD OF AND APPARATUS FOR TRANSFERRING ARTICLES FROM A FIRST POSITION TO A SECOND POSITION

(75) Inventors: Frank J. DiFrank, Toledo, OH (US); Larry N. Shue, Woodville, OH (US); Thomas R. Kirkman, Perrysburg, OH (US)

(73) Assignee: Owens-Brockway Glass Container Inc., Toledo, OH (US)

( * ) Notice: Subject to any disclaimer, the term of this patent is extended or adjusted under 35 U.S.C. 154(b) by 0 days.

(21) Appl. No.: 10/727,824

(22) Filed: Dec. 3, 2003

(51) Int. Cl.
*B25J 18/04* (2006.01)

(52) U.S. Cl. .................. 414/680; 74/424.6; 74/490.01; 901/25

(58) Field of Classification Search ................ 414/680, 414/729, 737, 752.1; 901/15, 25; 74/490.01, 74/490.03, 22 R, 424.6
See application file for complete search history.

(56) References Cited

U.S. PATENT DOCUMENTS

| | | | |
|---|---|---|---|
| 3,347,111 A * | 10/1967 | Rouillard et al. | ......... 901/25 X |
| 3,750,490 A * | 8/1973 | Fischer | ..................... 901/15 X |
| 4,494,973 A | 1/1985 | Perry | |
| 4,525,195 A | 6/1985 | Foster | |
| 5,046,914 A * | 9/1991 | Holland et al. | ........... 901/15 X |
| 5,271,757 A | 12/1993 | Houben et al. | |
| 5,425,794 A | 6/1995 | Frederick et al. | |
| 5,587,000 A | 12/1996 | Mann et al. | |
| 5,895,513 A | 4/1999 | Ciriello et al. | |
| 6,076,654 A | 6/2000 | Leidy | |
| 6,241,448 B1 | 6/2001 | Nicholas | |

* cited by examiner

*Primary Examiner*—Donald W. Underwood

(57) ABSTRACT

A takeout arm assembly (10) for an I.S. glass container forming machine, the arm assembly having a housing (14) that is oscillatible about the central axis of a first shaft (12). The housing has a first gear (16) that is coaxial with the first shaft and oscillatible with the housing, and with respect to the first shaft, the housing further having a second gear (18) that is positioned within and is rotatable with respect to the housing. The second gear is spaced from the first gear with the axes of the first and second gears being parallel to one another. A rack (30) having teeth in engagement with teeth on the first gear and the second gear is caused to move rectilinearly by oscillating motion of a reversible a.c. servo motor (26) that serves to drive the first gear, to thereby transmit turning motion from the first gear to the second gear. The rack is resiliently biased into engagement with the first gear and the second gear by spaced, spring-mounted rollers (36, 38) that rollingly engage the rack on a side opposed to the tooth side of the rack and in alignment with the first gear and the second gear, respectively.

8 Claims, 6 Drawing Sheets

METHOD OF AND APPARATUS FOR TRANSFERRING ARTICLES FROM A FIRST POSITION TO A SECOND POSITION

FIELD OF THE INVENTION

This invention relates to a method of and an apparatus for transferring articles from a first position to a second position by a pivoting motion that does not change the angular orientation of the articles during transfer. More particularly, this invention relates to a method and an apparatus of the aforesaid character for sequentially transferring freshly-formed glass containers one or more at a time from a blow molding position of a glass container forming machine of the individual section (I.S.) type to a deadplate of the machine to begin cooling while awaiting further transfer to a removal conveyor.

BACKGROUND OF THE INVENTION

As is explained, for example, in commonly assigned U.S. Pat. No. 6,076,654 (Leidy) and U.S. Pat. No. 6,241,448 B1 (Nicholas), the disclosure of each of which is incorporated by reference herein, or as is otherwise known, most glass containers are manufactured by a machine type known as an I.S. machine. Containers are manufactured by an I.S. machine at one or another of a multitude of machine sections, typically, 6, 8, 10 or even 12 sections, and typically 2, 3 or 4 containers simultaneously at each machine section, depending on container size and desired production rate. As a final step in the manufacture of containers by an I.S. machine, hot containers are transferred, in unison where 2 or more containers are simultaneously manufactured at a machine section, from open blow molds of the machine section in which they were formed to a nearby deadplate of the machine to permit the blown containers to partly cool before the containers are transferred to a removal conveyor for further processing.

Typically, containers are transferred from an I.S. machine section blow mold station to a deadplate by a takeout mechanism that employs a multitude of individual takeout heads extending from an arm, one such head for each container to be transferred from the machine section. After grasping of the containers by the takeout heads, the arm of the takeout mechanism from which the heads are supported is turned by approximately 180° while the containers remain suspended from the heads, to position the containers over the I.S. machine deadplate. The takeout heads then release the containers to remain on the deadplate, and the arm of the takeout mechanism is then reverted by 180° to begin a repeat of the operating cycle, when the next glass container or set of containers manufactured at the machine section is ready to be transferred.

To minimize motion of the freshly-formed glass containers during transfer, the oscillating arm of the takeout mechanism, from which the container-carrying heads or tongues are suspended, has a parallel motion mechanism to permit the containers to remain suspended from the takeout mechanism during oscillation of the head-carrying arm of the mechanism. U.S. Pat. No. 4,494,973 (Perry), which was assigned to a predecessor of the assignee of this application, the disclosure of which is also incorporated by reference herein, describes an I.S. machine oscillating takeout mechanism with a parallel motion mechanism to permit suspended containers to remain with their parallel axes vertical throughout the motion from the machine blow molds to the machine deadplate.

The parallel linkage mechanisms that are widely used in commercial I.S. machines typically use a reinforced (steel or Kevlar) Gates Rubber Seal Poly Chain GT Drive to act as a four bar linkage so that spaced, parallel shafts of the oscillating takeout arm maintain the same angular orientation through oscillation of the takeout arm about an axis of one of the shafts. This mechanism superceded chain driven parallel motion mechanisms, such as that of the aforesaid '973 patent, because chain driven mechanisms were more subject to wear than the belt driven mechanisms that replaced them. However, the belt driven mechanism of the type widely used has a maximum temperature rating of 185° F., and in a high temperature environment of an I.S. glass container forming machine, the temperature to which such a belt can be exposed can often exceed that temperature, possibly reaching a temperature of 225° F.–275° F., where the drive belt is much less strong than at its rated temperature.

Since the introduction of reinforced belt or chain driven parallel motion mechanisms of the aforesaid character, I.S. machine speeds have increased to permit greater I.S. machine production rates. These increased machine speeds require shorter container transfer times, with more precise control of acceleration and deceleration motions and with zero or near zero backlash in the operation of the oscillating takeout arm, and these added requirements have been difficult to achieve with reinforced belt or chain driven parallel motion mechanisms. What is needed, then, is a parallel motion drive mechanism that can be operated for extended periods of time in a high temperature environment, such as that near an I.S. machine, and can be operated for extended periods with minimal backlash, notwithstanding normal wear that will occur in the elements of the drive mechanism.

SUMMARY OF THE INVENTION

According to the present invention there is provided a takeout mechanism for transferring articles from a first position to a second position by an oscillating motion of an article-carrying arm in which the arm is equipped with a parallel motion mechanism to ensure that the axes of the articles carried by the arm do not change in an angular orientation during the transfer step. The parallel motion takeout mechanism of the present invention does not lose a significant degree of strength in environments where temperatures can exceed 185° F., and this feature makes a takeout mechanism of the present invention especially well suited for use as a takeout mechanism for transferring freshly-formed glass containers from molding locations of a glass container forming machine of the I.S. type to a deadplate of the machine.

The takeout mechanism of the present invention is powered by a reversible a.c. servo motor for precise control over operating speeds, which permits optimum control over acceleration and deceleration rates, and operates with minimal backlash by transmitting motion from a drive gear, whose axis remains fixed, by a rack to a driven gear, whose axis oscillates in an arc of approximately 180°. Spring-mounted rollers are provided, which are aligned with the axes of the drive and driven gears, to urge the rack into close engagement with the drive and driven gears, notwithstanding any wear that will occur in the drive and/or driven gears and/or rack during the normal life of the oscillating takeout arm.

Accordingly, it is an object of the present invention to provide an oscillating, article transfer mechanism with an improved parallel linkage. More particularly, it is an object of the present invention to provide a transfer mechanism of the aforesaid character that is sufficiently resistant to elevated temperatures to be well-suited to serve as a takeout mechanism of the type used in glass container forming machines of the I.S. type and to be able to operate for a prolonged duration with minimal backlash.

For a further understanding of the present invention and of the objects thereof, attention is directed to the drawing and the following brief description thereof, to the detailed description of the invention and to the appended claims.

DETAILED DESCRIPTION OF THE INVENTION

Figure 1:
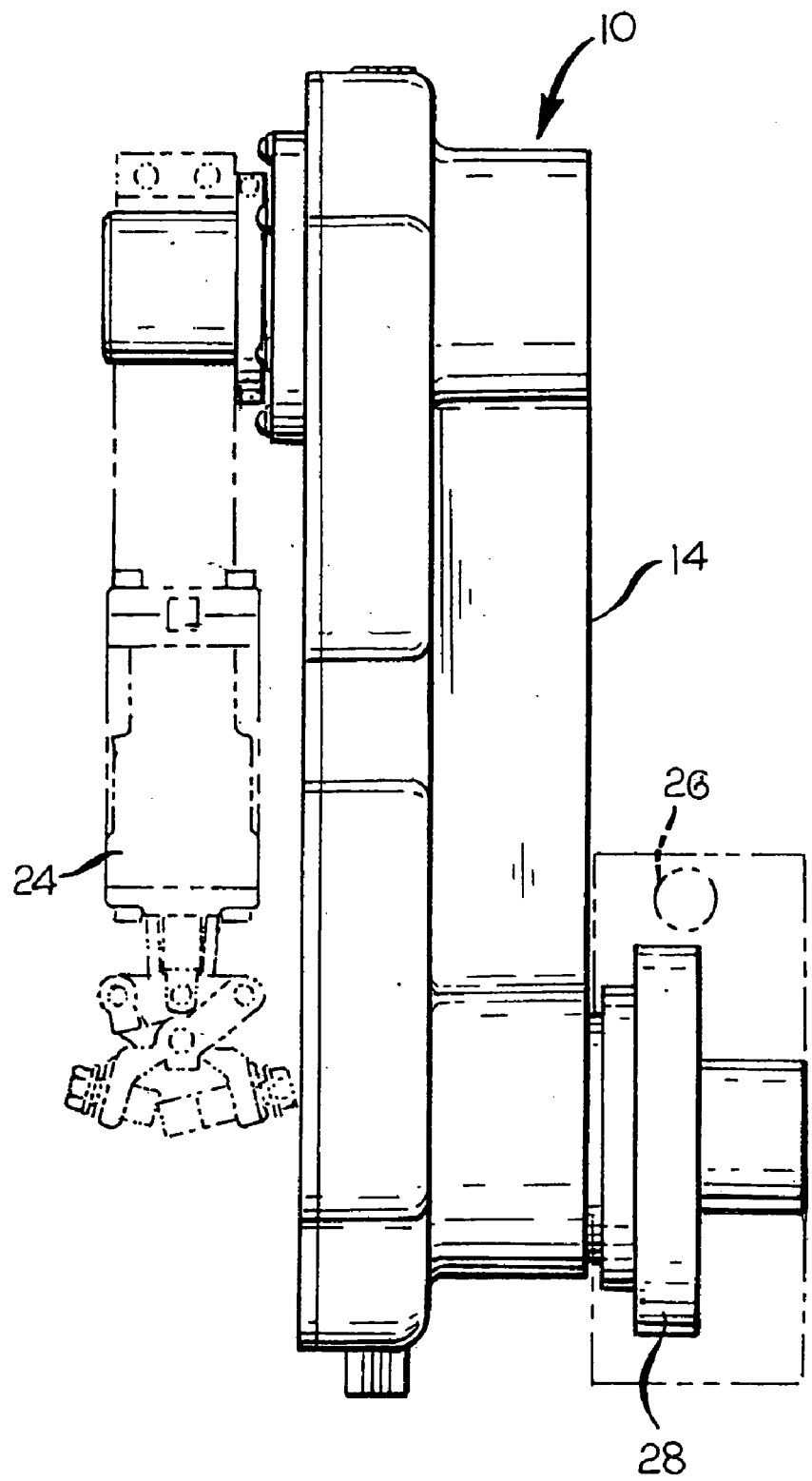
FIG. 1 is an elevational view of an I.S. machine takeout arm with a parallel motion mechanism according to the present invention.
Figure 2:
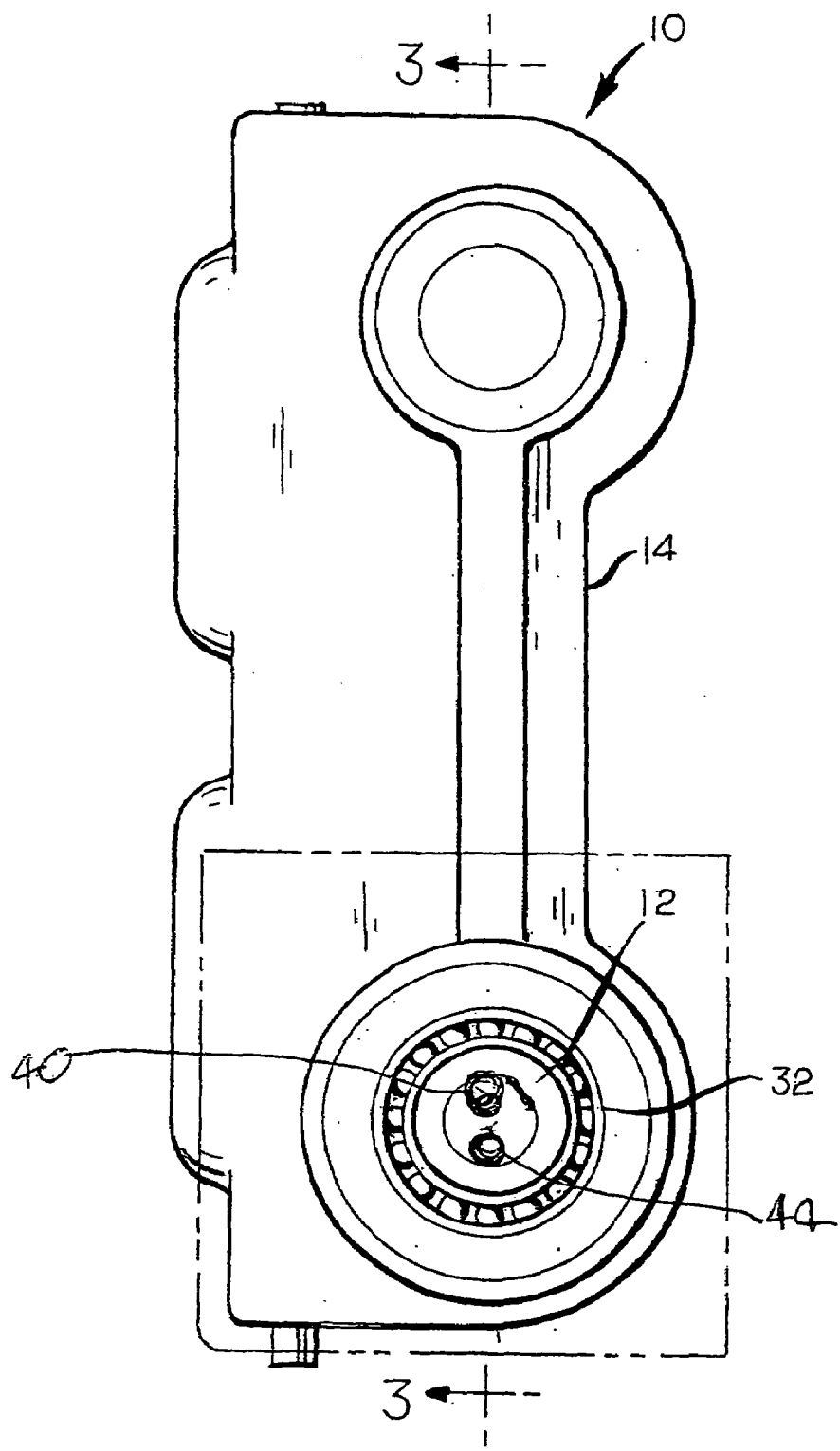
FIG. 2 is a side elevational view of the takeout arm of FIG. 1.
Figure 3:
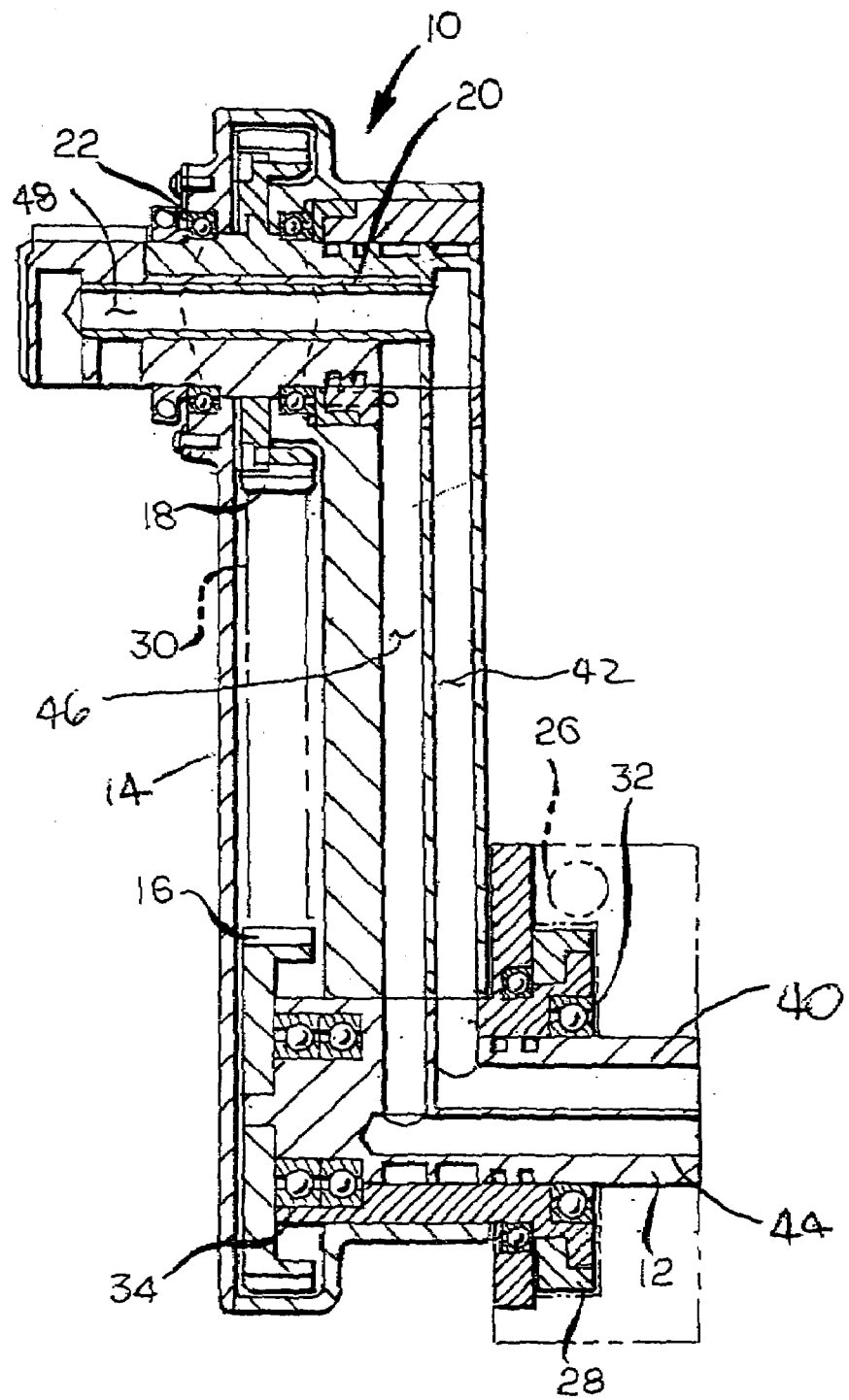
FIG. 3 is a sectional view taken on line 3—3 of FIG. 2.
Figure 5:
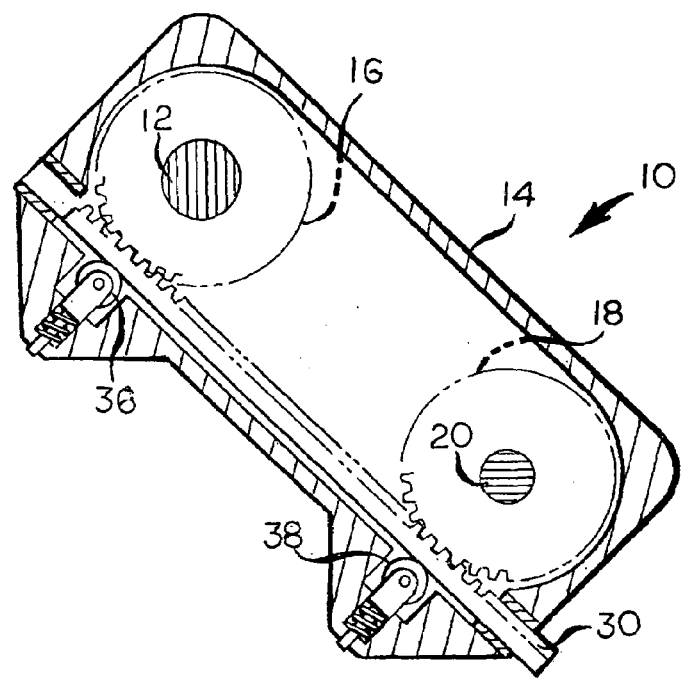
FIGS. 4–8 are schematic views of the takeout arm of FIGS. 1–3 at the various locations during the cycle of the takeout arm.
Figure 4:
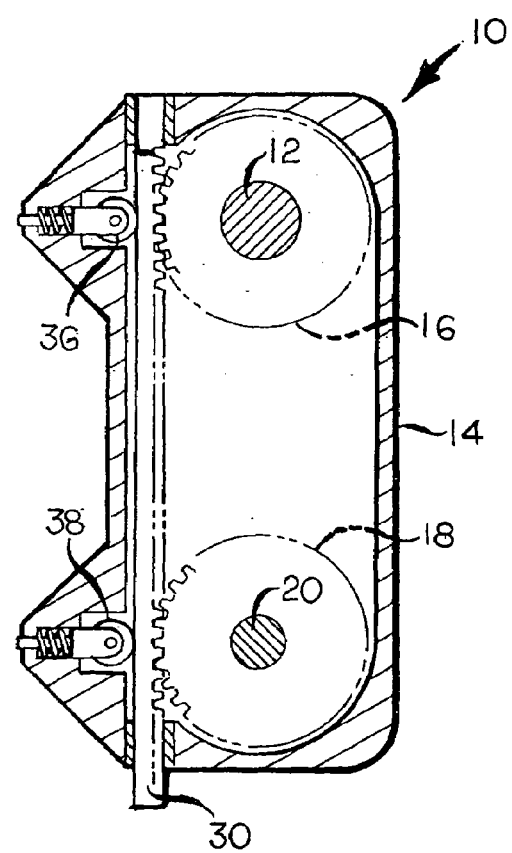
Figure 7:
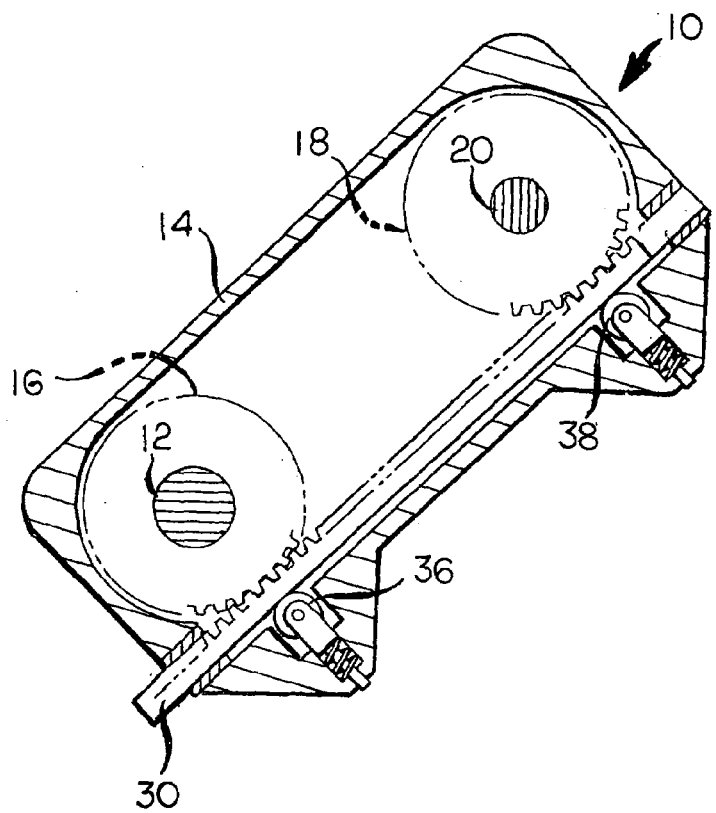
Figure 6:
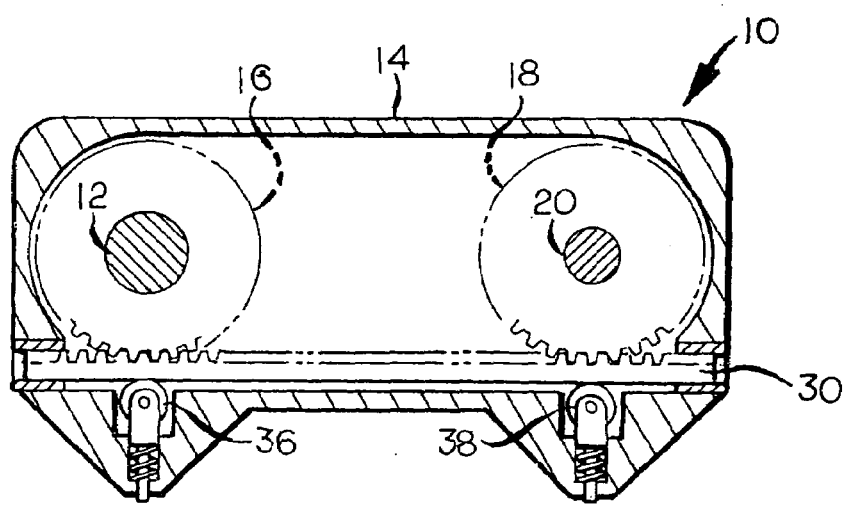
Figure 8:
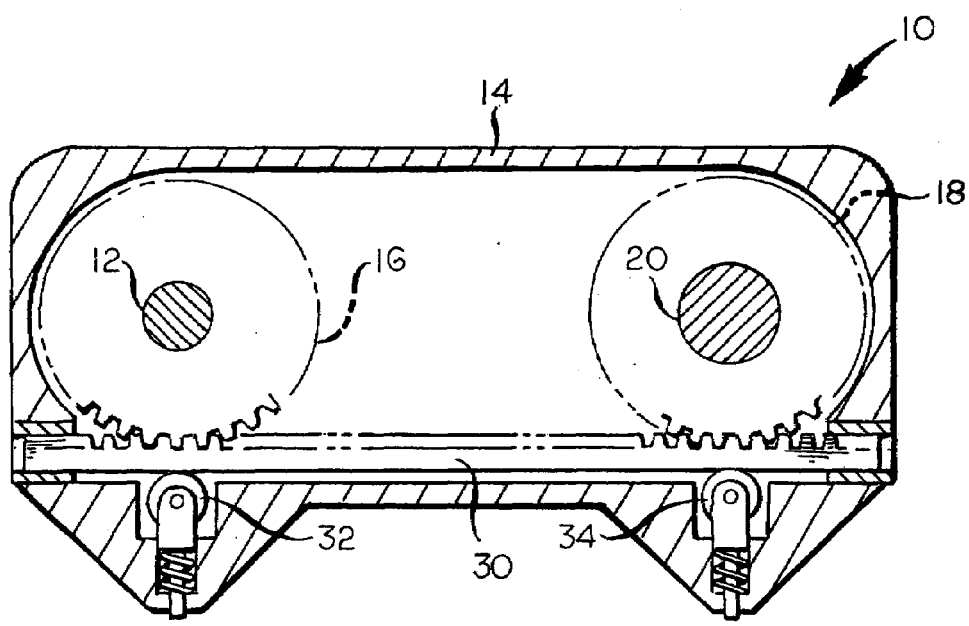

A takeout arm assembly according to the preferred embodiment of the present invention is indicated generally by reference number 10 in the drawing. The takeout assembly 10 includes a fixed shaft 12, which corresponds in function to the shaft 18 of the aforesaid '973 patent.

A multi-piece housing 14 is journalled on the shaft 12 to be oscillatible with respect to the shaft 12. Located within the housing 14 is a gear 16 with a plurality of teeth around its periphery. The gear 16 is also oscillatible with the housing 14. A second gear 18, which is spaced from the gear 16 and whose central axis is parallel to that of the gear 16, is also located within the housing 14. The gear 18 is co-axially secured to a shaft 20, which corresponds in function to the shaft 23 of the '973 patent, and the second gear 18 and the shaft 20 are caused to oscillate with the gear 16 under power from a reciprocating rack 30, as will be hereinafter explained more fully.

A bearing 22 is mounted within the housing 14 to permit the gear 18 and the shaft 20 to turn about the longitudinal central axis of the gear 18 with respect to the housing 14. At an opposed end of the shaft 20, a takeout head 24, which corresponds in function to element 33 of the '973 patent, is suspended to extend generally parallel to the housing 14. A gear 28 is journalled on the shaft 12 around a bearing 32, and the gear 26 is caused to oscillate with respect to the shaft 12 under power from a reversible, a.c. servo motor 26. The motions of the reversible, a.c. servo motor 26 are precisely controllable to permit very accurate control of the acceleration and deceleration motions of the takeout head 24.

To maintain a fixed angular orientation of the takeout head 24 that is suspended from the shaft 20, the rack 30 is positioned within the housing 14 for rectilinear motion with respect thereto. The rack 30 is in toothed engagement with the gears 16 and 18, and transmits turning motion from the drive gear 16, which is journalled on the shaft 12 by a bearing 34, to the driven gear 18 as the drive gear 16 is caused to oscillate by the motion of the servo motor 26. Close contact between the rack 30 and each of the gears 16 and 18 is obtained by resiliently biasing the rack 30 against the gear 16, 18 by spring-mounted rollers 36 and 38, which engage the rack 30 on its back side, that is, the side away from the engagement of the rack 30 with gears 16, 18. In that regard, the spring mounted roller 36 is aligned with the gear 16, and the spring-mounted roller 38 is aligned with the spring 18. Thus, any normal wear of the gear 16, the gear 18 and/or the rack 30 that may occur during normal operation of the takeout assembly 10, which could otherwise lead to the development of backlash between the gear 16 and the rack 30 and/or the gear 18 and the rack 30, is taken up by the advance of the rack 30 against the teeth of the gear 16 and/or the teeth of the gear 18 under the resilient biasing force of the spring mounted roller 36 or the spring mounted roller 38, as the case may be.

The shaft 12 has a passage 40 leading thereunto, and the passage 40 communicates with a passage 42 in the arm 14 in the FIG. 1 position of the assembly 10 to provide compressed air, through a passage 48 in the shaft 20, for the operation of tongs carried by the takeout head 24.

As is known, for example, from U.S. Pat. No. 5,807,419 (Rodriquez-Wong) and from commonly-assigned, co-pending U.S. application Ser. No. 10/161,966, the disclosure of which is incorporated by reference herein, it is occasionally desired to incorporate the functions of a takeout head, such as the takeout head 24, with a blowhead to inject blowing air into a parison in a blow mold. If desired, the assembly 10 may be adapted to support a combined takeout/blowhead by providing the shaft 12 with a second passage, the passage 44, which communicates with a second passage in the arm 14, namely, the passage 46. Compressed, blowing air, thus, can be delivered to a combined takeout/blowhead in place of the takeout head 24 when the arm 14 is in its FIG. 1 position.

Although the best mode contemplated by the inventors for carrying out the present invention as of the filing date hereof has been shown and described herein, it will be apparent to those skilled in the art that suitable modifications, variations, and equivalents may be made without departing from the scope of the invention, such scope being limited solely by the terms of the following claims and the legal equivalents thereof.

We claim:

1. Apparatus for transferring an article from a first position to a second position without varying an angular orientation of the article, said apparatus comprising, in combination:

a fixed shaft;
a housing journalled on said fixed shaft to be oscillatible with respect to said fixed shaft;
a first gear within said housing, said first gear being co-axial with said fixed shaft and being oscillatible with respect to said fixed shaft, said first gear having a plurality of teeth in an outer periphery;
a rotatable shaft mounted within said housing;
a second gear fixed to said rotatable shaft within said housing and oscillatible with said housing, said second gear being spaced from said first gear and being rotatable with respect to said housing about a central axis of said second gear, said central axis of said second gear being parallel to the axis of oscillation of said first gear;
a rack extending through said housing and having a plurality of teeth in engagement with teeth on said first gear and teeth on said second gear; and
resilient biasing means for resiliently biasing said rack into engagement with said first gear and said second gear to minimize backlash between said first gear and said second gear.

2. Apparatus according to claim 1, wherein said biasing means comprises:

a first spring-mounted roller engaging said rack at a location opposed to and aligned with a central axis of said first gear; and
a second spring-mounted roller engaging said rack at a location opposed to and aligned with a central axis of said second gear.

3. Apparatus according to claim 1 and further comprising:
a reversible a.c. servo motor for oscillatingly driving said first gear.

4. Apparatus according to claim 1 further including a mold of an I.S. glass container forming machine at said first position and a deadplate of said I.S. glass container forming machine at said second position.

5. The method of providing a parallel motion to an end of an arm that is oscillatible about an axis spaced from said end to prevent varying of an angular position of said end during oscillation of the arm, the method comprising:
   providing a first gear with a plurality of teeth on a periphery thereof, the first gear being coaxial with the axis of oscillation of the arm, the first gear being oscillatible with the arm;
   providing a second gear with a plurality of teeth on a periphery of the second gear, the second gear being spaced from the first gear, the second gear being oscillatible with the arm and rotatable with respect to the arm about an axis that is spaced from the axis of oscillation of the arm;
   simultaneously engaging the first gear and the second gear with a rack having a plurality of teeth in engagement with teeth on the first gear and teeth on the second gear; and
   resiliently biasing the rack into engagement with the first gear and the second gear.

6. The method according to claim 5 wherein the arm is a takeout arm of an I.S. glass container forming machine.

7. The method according to claim 6 and further comprising:
   operating the arm in an environment where the temperature exceeds 185° F.

8. The method according to claim 7 wherein the temperature is at least 225° F.

* * * * *

UNITED STATES PATENT AND TRADEMARK OFFICE
CERTIFICATE OF CORRECTION

| | | |
|---|---|---|
| PATENT NO. | : 7,063,498 B1 | Page 1 of 1 |
| APPLICATION NO. | : 10/727824 | |
| DATED | : June 20, 2006 | |
| INVENTOR(S) | : DiFrank et al. | |

It is certified that error appears in the above-identified patent and that said Letters Patent is hereby corrected as shown below:

column 4, line 5 should read as follows:

gear 18. Thus, any normal wear of the gear 16, the gear 18

Signed and Sealed this

Nineteenth Day of September, 2006

JON W. DUDAS
*Director of the United States Patent and Trademark Office*